(No Model.) 9 Sheets—Sheet 1.

F. H. RICHARDS.
ENVELOPE MACHINE.

No. 284,483. Patented Sept. 4, 1883.

Witnesses:
Walter Fowler,
R. F. Hyde.

Inventor;
Francis H. Richards
By Henry A. Chapin
Atty (No Model.) 9 Sheets—Sheet 3.

F. H. RICHARDS.
ENVELOPE MACHINE.

No. 284,483. Patented Sept. 4, 1883.

Witnesses:
H. Walter Fowler
R. F. Hyde

Inventor:
Francis H. Richards
By Henry A. Chapin
Atty (No Model.)
9 Sheets—Sheet 4.
F. H. RICHARDS.
ENVELOPE MACHINE.
No. 284,483.  Patented Sept. 4, 1883.
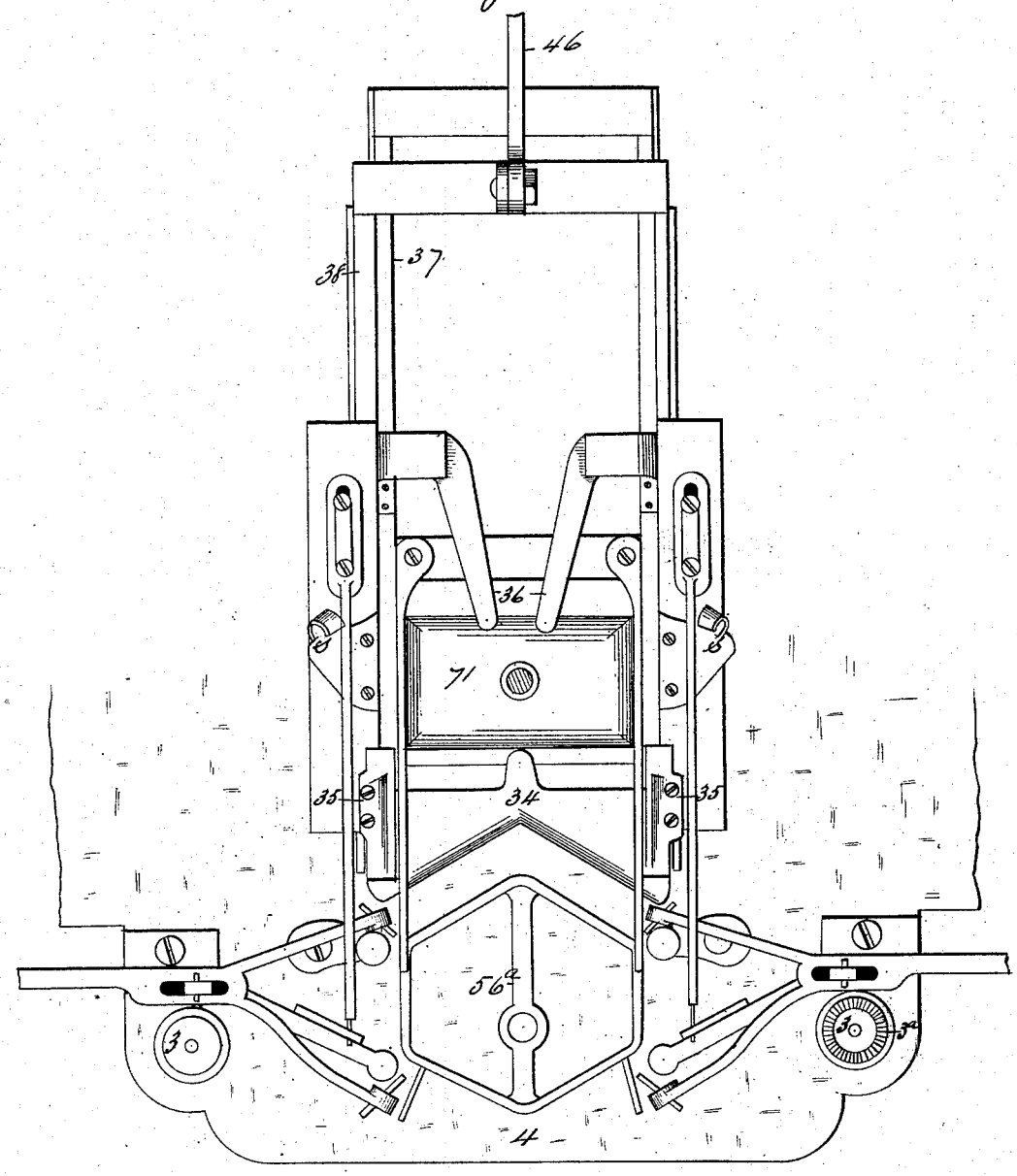
Witnesses;
Walter Fowler,
R. F. Hyde
Inventor;
Francis H. Richards
By Henry A. Chapin
Atty (No Model.)
9 Sheets—Sheet 5.
F. H. RICHARDS.
ENVELOPE MACHINE.
No. 284,483. Patented Sept. 4, 1883.
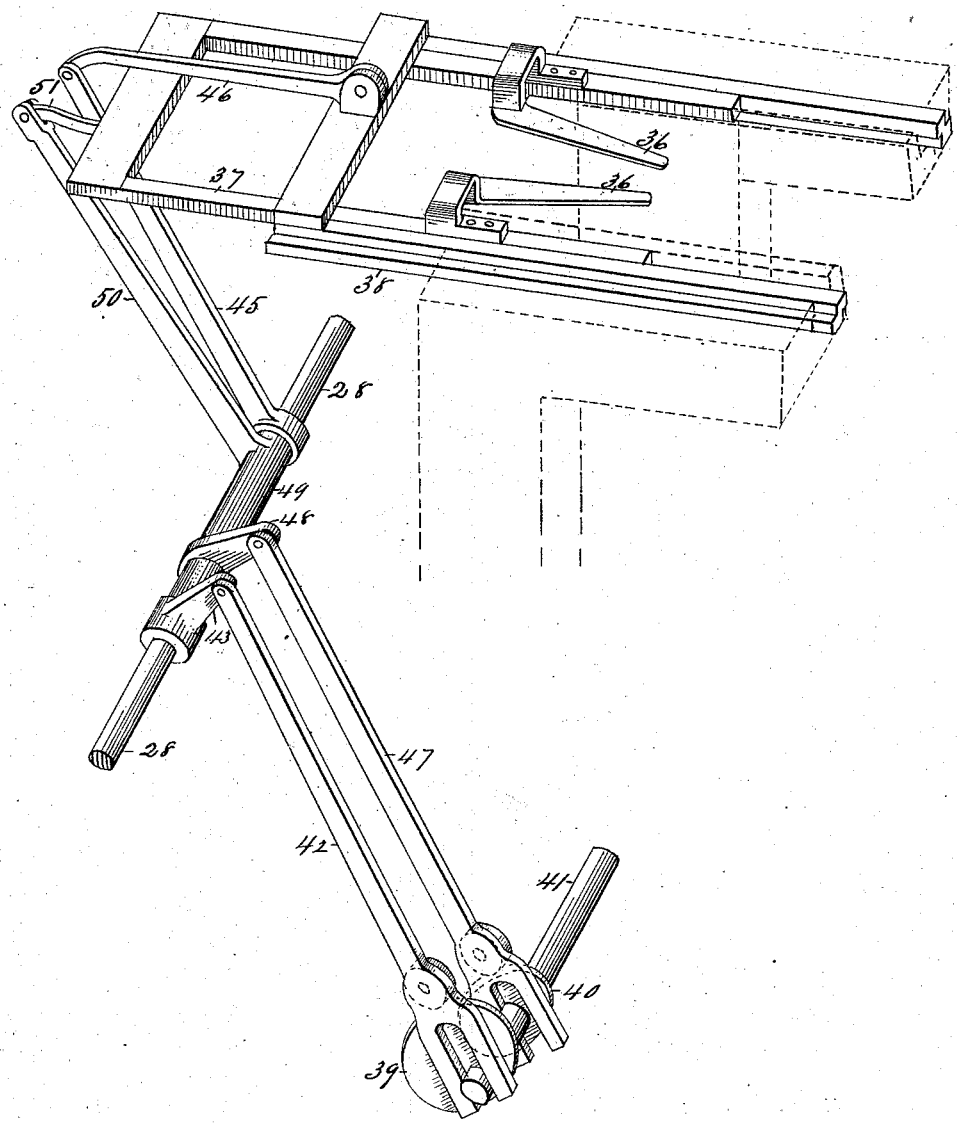

(No Model.)
9 Sheets—Sheet 6.
F. H. RICHARDS.
ENVELOPE MACHINE.
No. 284,483. Patented Sept. 4, 1883.
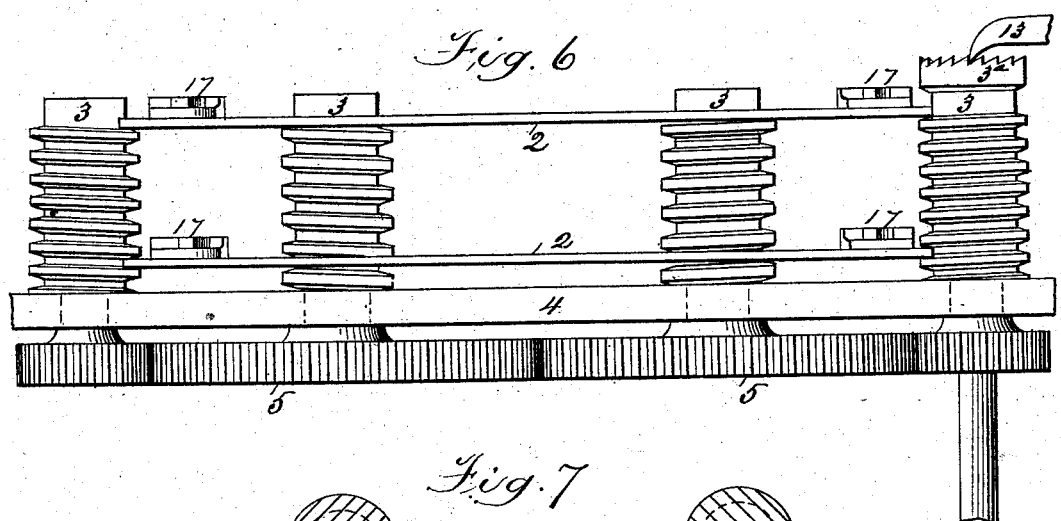
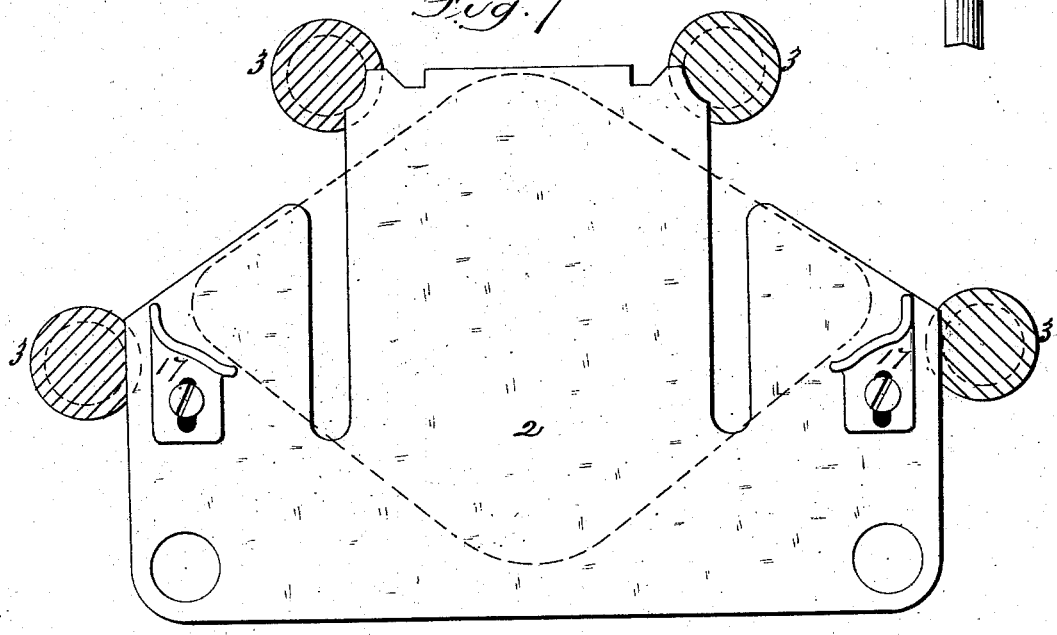

(No Model.)

F. H. RICHARDS.
ENVELOPE MACHINE.

No. 284,483. Patented Sept. 4, 1883.

Witnesses:
D. Walter Fowler
R. F. Hyde

Inventor:
Francis H. Richards
By Henry A. Chapin
Atty (No Model.)  9 Sheets—Sheet 8.
F. H. RICHARDS.
ENVELOPE MACHINE.
No. 284,483. Patented Sept. 4, 1883.
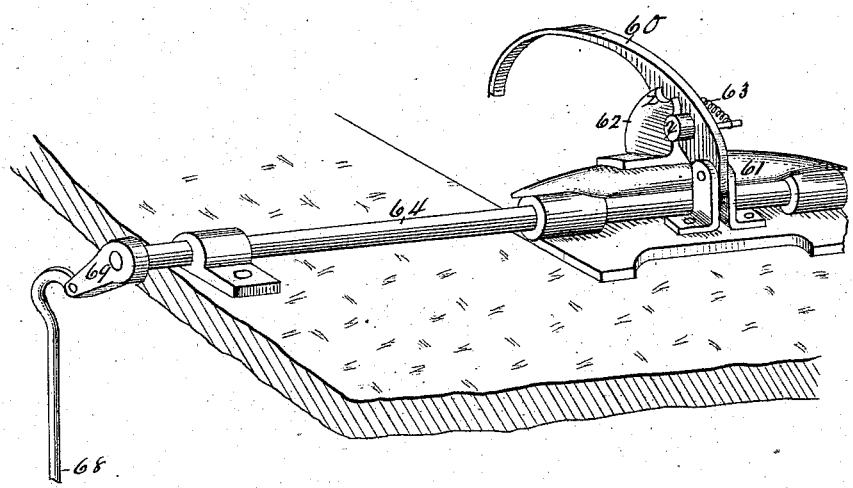
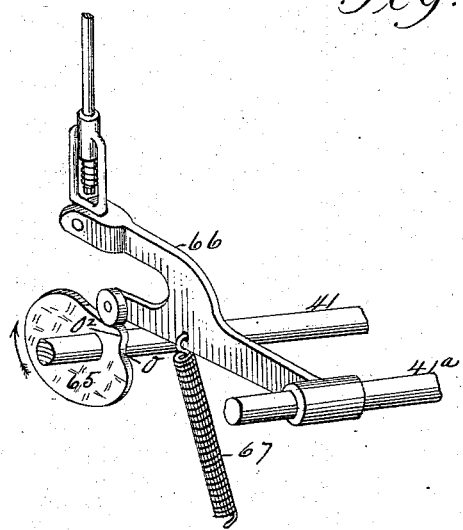
Fig. 10.
Witnesses:
Walter Fowler,
R. F. Hyde.
Inventor;
Francis H. Richards
By Henry A. Chapin
Atty (No Model.) 9 Sheets—Sheet 9.

F. H. RICHARDS.
ENVELOPE MACHINE.

No. 284,483. Patented Sept. 4, 1883.

UNITED STATES PATENT OFFICE.

FRANCIS H. RICHARDS, OF SPRINGFIELD, MASSACHUSETTS.

ENVELOPE-MACHINE.

SPECIFICATION forming part of Letters Patent No. 284,483, dated September 4, 1883.

Application filed July 17, 1882. (No model.)

*To all whom it may concern:*

Be it known that I, FRANCIS H. RICHARDS, a citizen of the United States, residing at Springfield, in the county of Hampden and State of Massachusetts, have invented new and useful Improvements in Envelope-Machines, of which the following is a specification.

This invention relates to that class of envelope-machines which are adapted to gum and fold envelope-blanks which are cut to proper form and placed on the machine, the object being to provide improved mechanism for moving the pile of envelope-blanks upward toward the pickers or gummers, and for controlling the action of said mechanism by the varying movements of said gummers as they pick up the blanks and reduce the height of the blank-pile, and improved mechanism for supplying gum to the pickers, and improved devices for carrying the blanks from the pickers to a proper position over the folding-box, and for discharging folded envelopes from said box.

Figure 1:
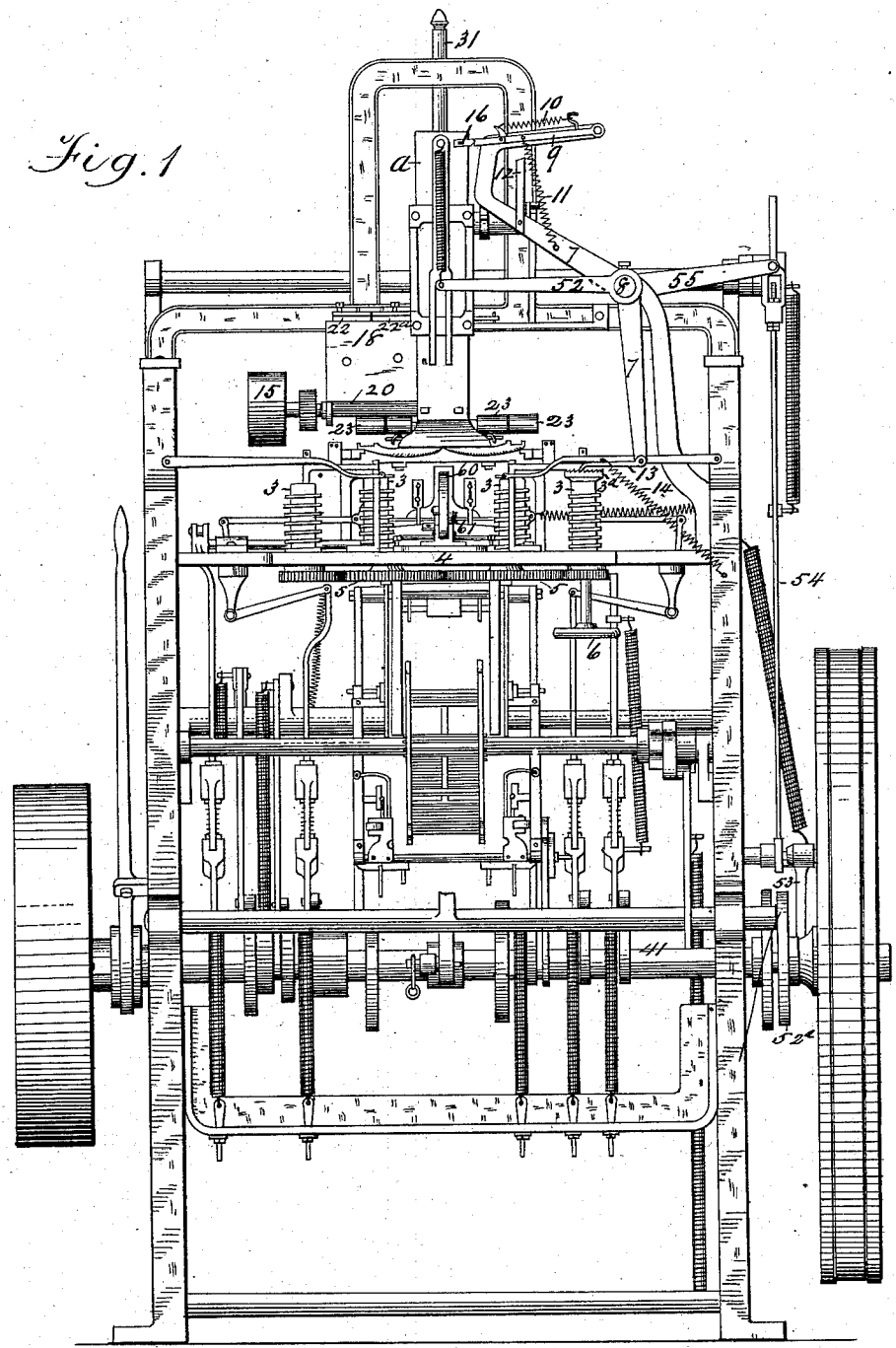
Figure 2:
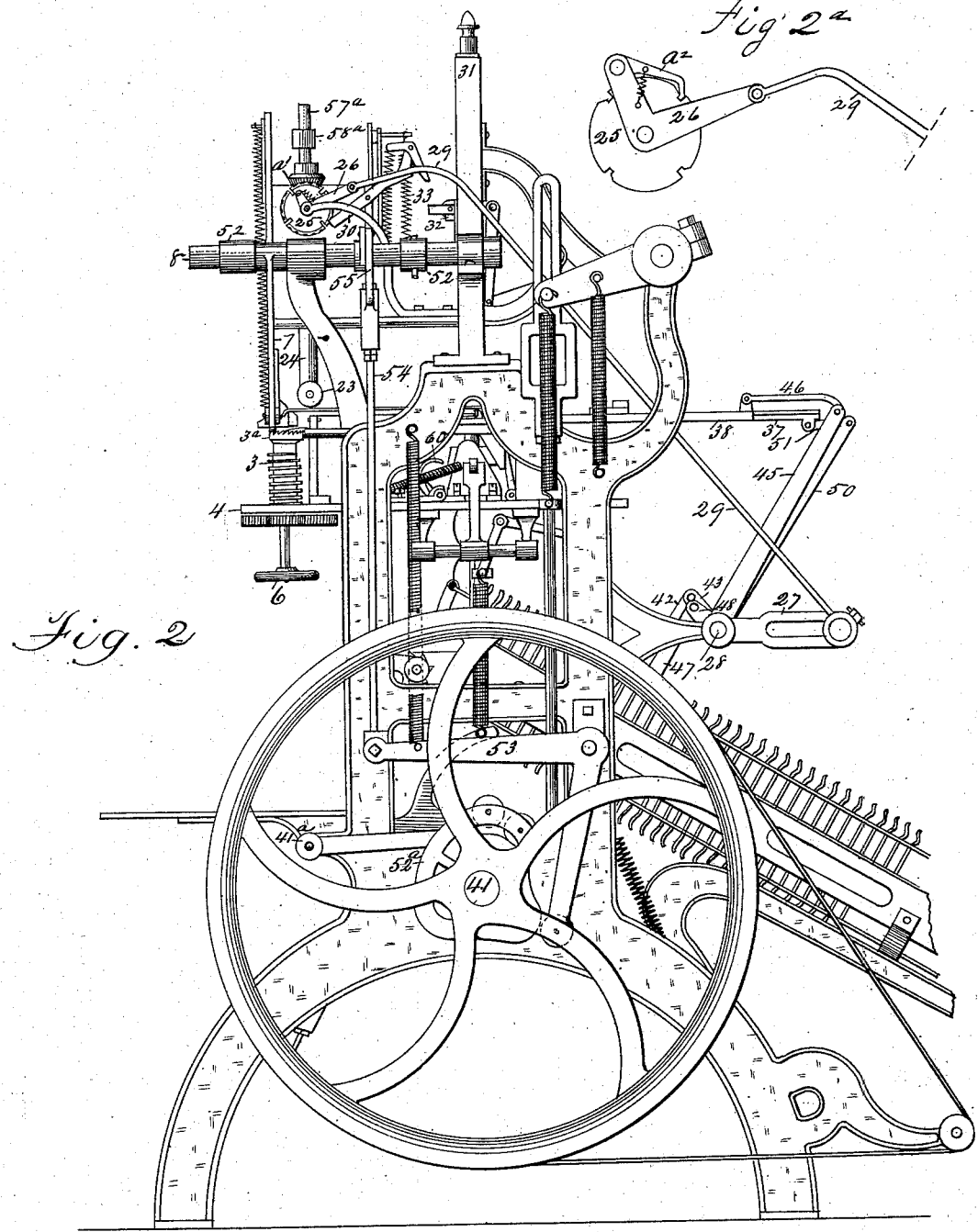
Figure 3:
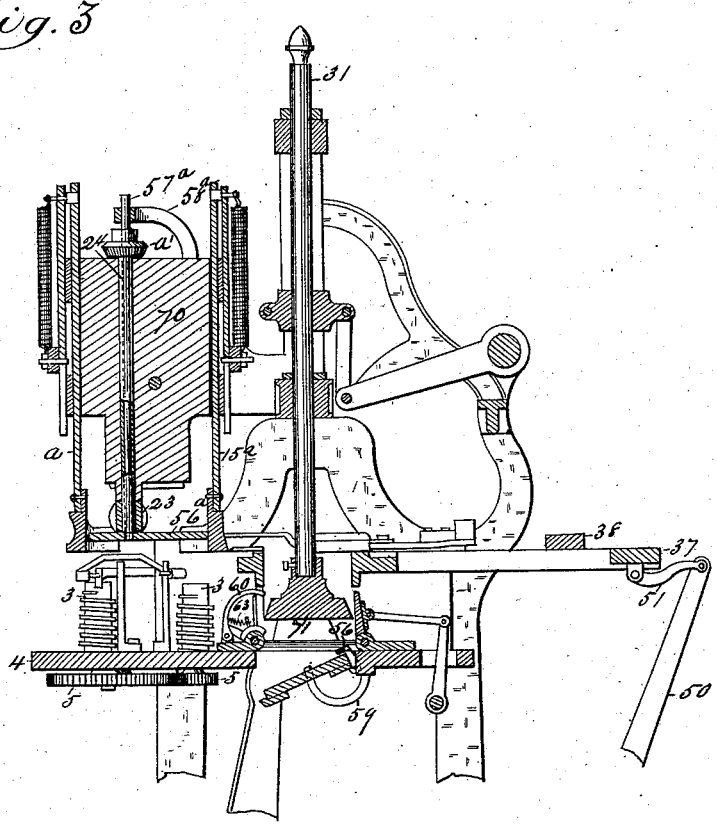
Figure 8:
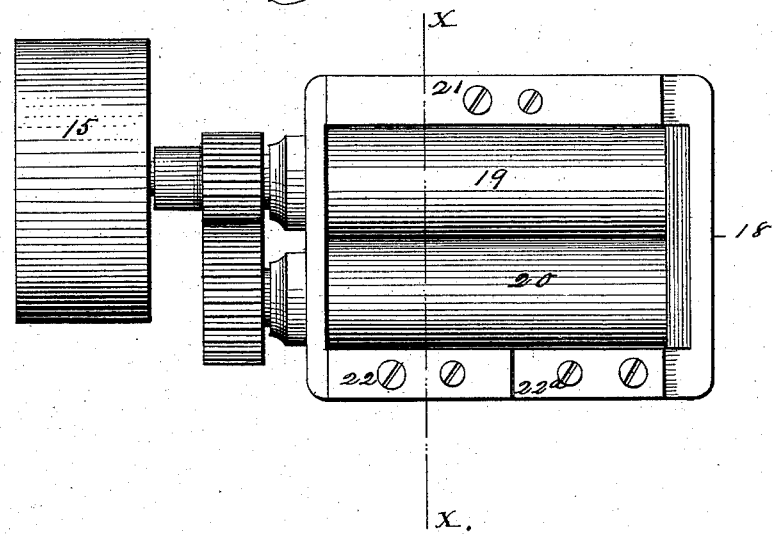
Figure 9:
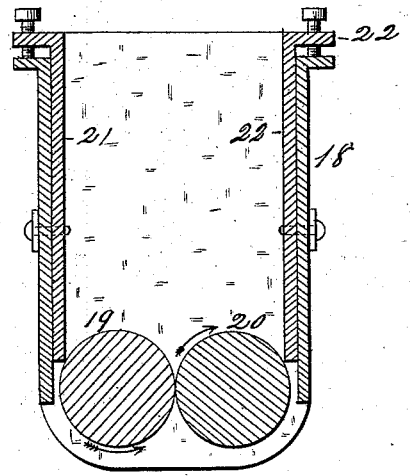
Figure 11:
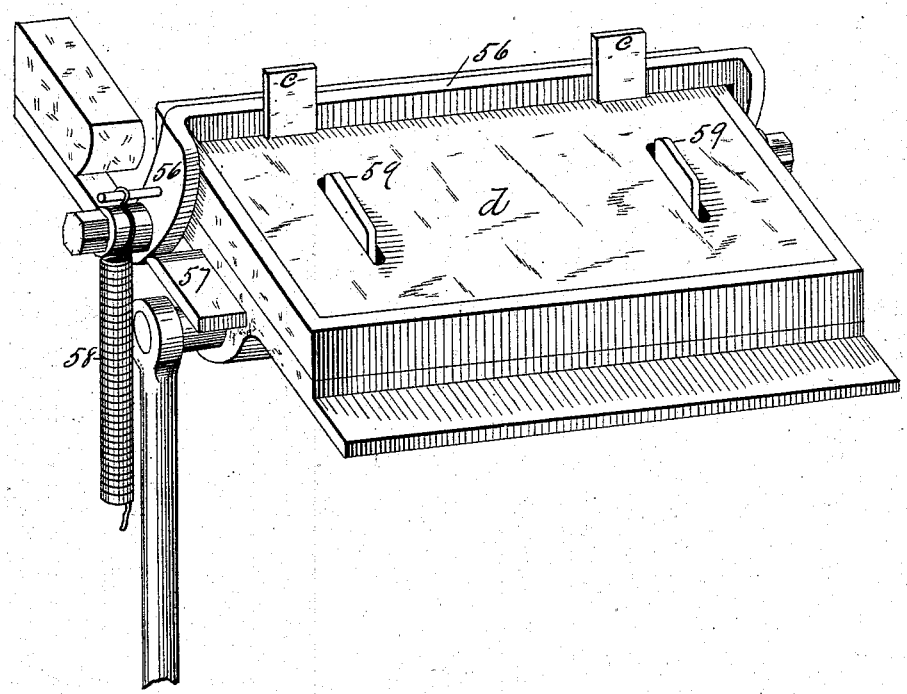

In the drawings, forming part of this specification, Figure 1 is a front elevation of an envelope-machine embodying my improvements. Fig. 2 is a side elevation. Fig. 2ª are detail parts of the gumming mechanism. Fig. 3 is a view partly in section of portions of the blank feeding, gumming, and folding mechanism. Fig. 4 is a plan view of the blank-carriers and other co-operating devices. Fig. 5 is a view of the rear end of the blank-carrier frames and of their operating devices. Fig. 6 is a front elevation of the blank-table and of a portion of the blank-elevating devices. Fig. 7 is a plan view of a blank-plate, showing the position, in dotted lines, of the blanks when placed thereon, and its elevating-screws in transverse section. Fig. 8 is a plan view of the top of the gum-box with its rollers and their actuating mechanism. Fig. 9 is a transverse section of said gum-box on the line $xx$, Fig. 8. Fig. 10 is a detail view of the devices for discharging envelopes from the folding-box, and their operating devices. Fig. 11 is a view of the bottom of the folding-box detached from the machine, and a portion of the devices connected therewith for forcibly shooting envelopes therefrom toward the drying-chain.

The improved devices for moving the pile of envelope-blanks upward, so as to keep its upper surface within proper working distance from the gummed edge of the pickers, and for supporting the blanks thereunder, are as follows: The usual form of frame supports the working parts of this machine and the table 4, located in front of the machine, as well as the picker-head 70, above said table. The pickers $a$ and $15^a$ are arranged, in the usual way, on the front and rear of said head, and are operated by the arms 52 on the rock-shaft 8, the latter being connected with cam $52^a$ on the main shaft 41 through the arm 55, rod 54, and elbow-lever 53, as usual. The blank-supporting plates 2 2 are movable, and are adapted to have placed upon them envelope-blanks in a pile, and to serve for holding the latter while being carried to the machine, and to support them while under the pickers. Said pile of blanks on a plate, 2, occupies about the position shown in dotted lines in Fig. 7, the guides 17 thereon serving to properly determine it. Four coarsely-threaded vertical-elevating screws, 3 3 3 3, are set to rotate in the table 4, and are connected by gears 5 with each other, the latter being located under said table. One of said screws has a shaft extending below table 4, (see Fig. 1,) on which is a hand-wheel, 6, which provides means for turning said screws by hand and independently of the automatic devices therefor, described below. Said plates 2 are formed so as to provide for placing them on table 4 in the relation to the screws 3 shown in Figs. 6 and 7—that is to say, with their edges in engagement with the threads of said screws—so that as the latter rotate, said plates, and the blanks they may carry, are moved upward toward said pickers, and when necessary said plates may be drawn away and removed from said screws, and others bearing blanks be placed therein at the pleasure of the operator. One of said screws 3 is provided with a ratchet, $3^a$, and a pawl, 13, pivoted to a lever, 7, and held in engagement with said ratchet by a spring, 14, is given a reciprocating motion to rotate said ratchet, and consequently said series of screws 3, by the front picker, $a$, when the pile of blanks should move up to bring them within reach of the picker, as follows: Said lever 7 is hung loosely to vibrate on shaft 8, and its upper end so overhangs as to cause it to swing toward the picker $a$. A jointed latch, 9, is pivoted on the side of said lever, near the end of the same, which extends away from said picker. A spring, 10, is connected to a hook on each part of said jointed latch, as shown in Fig. 1, whereby the end of said latch is caused to be returned to its straight position after being depressed. A spring, 11, causes latch 9 to rest upon the post 12 when not interfered with, and said latch occupies that position until its end engages with a short arm, 16, on the edge of said picker $a$. It will be seen that when the end of latch 9 is free from said arm 16 lever 7 may so swing as to draw the pawl 13 to the right, Fig. 1. The picker $a$ is given a vertical reciprocating motion, as above described, causing arm 16 thereon (when latch 9 is lying on post 12) to strike the jointed end of said latch each time the picker descends against the pile of blanks to pick up one; but until arm 16 can move down (permitted by the gradual reduction of the pile of blanks) far enough to engage under the end of latch 9 it simply strikes and deflects its end; but immediately that it catches upon the end thereof, as in Fig. 1, and moves up, the upper end of lever 7 is swung upward and outward, its lower end swings toward ratchet $a^3$, causing the screws 3 to be rotated and the pile of blanks to be moved up to keep the surface thereof high enough to permit the pickers to always come in proper gumming contact therewith. Lever 7, having been caused to so operate, swings back again, letting latch 9 rest on post 12, as before, ready to again act, as before, when the reduction of the height of the pile of blanks demands it. In a rapidly-working machine pawl 13 is almost constantly operating to rotate the screws 3, and in practice said devices serve to operate with the variation in the height of said pile equal to the thickness of only four blanks. When one of said plates 2, as in Fig. 6, has reached the upper end of screws 3, it is removed by the operator, and any blanks which may be remaining on it are dropped onto the plate beneath, the latter having been previously inserted between said screws. The direction of rotation of said screws is such that plates 2 are thereby held in place.

The improved mechanism for supplying gum to the pickers $a$ and $15^a$ is as follows: A gum-box, 18, having two gum-rolls, 19 20, therein, which constitute its bottom, and which are geared together and rotated by power applied to pulley 15, is located at one side of and on a line between said pickers. Said rolls 19 20 are of about equal diameters, and are given unequal speeds for the purpose of increasing their efficiency. Said gum-box 18 is provided with two slides, 22 and $22^a$, on one side thereof, and one, 21, on the opposite side, all three of which are adapted to be adjusted vertically by screws through a flange on their upper ends to bring the edge on their lower ends which is nearest to said rolls into proper operative relation thereto for the purpose below described. The roll 19, which runs the fastest, is set preferably a little higher than roll 20, so the latter only is relied upon to give off gum to the rolls, which carry it from thence to the edges of the pickers. When said gum-box is supplied with gum, to be operated the slide 22 is moved down, so that its edge is brought so near roll 20 as to prevent the latter from carrying around more gum than is needed. Roll 19 co-operates with roll 20 to return any surplus of gum to the box, and is given a quicker movement for this purpose, whereby the surface of the roll 19 is made, so to speak, to have a dragging motion against any surplus gum on roll 20, said rolls being set very near to each other—so near as to have the appearance of being in contact—whereas in practice such is not the case. Slide 21 is set so close to roll 19 as to prevent it from carrying gum out of the box, and thus leave it better adapted to take any surplus gum from roll 20, as before stated. The slides 22 $22^a$ are capable of independent adjustment against roll 20 for the purpose hereinafter set forth.

The means for transferring gum from roll 20 of the gum-box 18 consist of four gumming-rolls, 23. Said rolls are hung on two short horizontal cylindrical arms, which are secured at opposite points on the lower end of a vertical hollow shaft, 24, set in the picker-head 70. Said rolls 23 are adapted to revolve on said arms when they come in contact with the surface of roll 20 and with the edges of the pickers $a$ $15^a$, when they are rotated in a horizontal plane by the revolution of said shaft 24. It will be observed that shaft 24 is set nearer to the front than to the rear picker, Fig. 3, whereby the outer rolls, 23, will be carried beyond the front picker, $a$, and will only roll against and gum the rear picker, $15^a$, while the inner rolls will gum only the front picker. It is often desirable in practice to supply more gum to one picker than to the other, and in this device that end is reached by so adjusting one of the slides—say 22—that the part of the surface of roll 20 opposite said slide may carry around more gum than the part thereof opposite slide $22^a$, and since only the outer two of rolls 23 can come in contact with said most-liberally gummed part of roll 20 and with the edges of the rear pickers, it follows that the latter will be most thickly gummed. Said shaft 24, as above mentioned, is hollow, and permits of passing a shaft, $57^a$, through it, to the lower end of which is secured the usual picker-spider, $56^a$, for arresting the motion of the blanks when the latter are lifted by the pickers, and causing them to be detached from the latter. Said shaft $57^a$ is supported by the arm $58^a$. A bevel-gear, $a'$, is secured on shaft 24, just above the picker-head, and a bevel-gear ratchet or notched gear-wheel, 25, is hung on a short arm by the side of said gear $a'$, and is adapted to engage with the latter. Said wheel 25 is provided with notches in its periphery, Figs. 2 and $2^a$, and is adapted to be intermittently rotated by the oscillating elbow-lever 26 and the pawl $a^2$, which is pivoted to the latter, as shown in an enlarged view in Fig. 2ª. Said lever 26 oscillates upon the same short shaft that wheel 25 is hung on. Said oscillatory movements of lever 26 are derived from its connection with arm 27 by rod 29, Fig. 2, said arm being carried by the rock-shaft 28, and the latter being operated by suitable cam-connections with the main shaft 41, as shown in Fig. 5.

The movements of the above-described parts which govern the intermittent rotary action of wheel 25, and consequently shaft 24 and the gumming-rolls 23, are so timed as to cause the latter to be carried in a horizontal plane around under the gum-roll 20 and the pickers $a$ and 15ª each time that the latter rise up, transferring gum from the former to the latter, as above described, to be subsequently applied to each envelope-blank previous to carrying it to the folding-box, as hereinafter set forth.

A stop-lever, 30, Fig. 2, of ordinary construction, is adapted to have one end drop into said notches in wheel 25 and prevent the latter from throwing by when suddenly turned by the pawl and lever, as above described. Said lever 30 is held against wheel 25 by a spring, 33, and is made to swing away from said wheel by the contact of an arm, 32, with its upper end when the folding-box plunger-post 31 rises, on which is said arm.

The improvements in the mechanism for taking the gummed blanks from the pickers and carrying them over the folding-box and under the plunger 71 are as follows: The blank-carriers consist of two horizontally-moving frames, 37 and 38, the former moving within the latter and supporting upon its end nearest the pickers the plate 34 and the blank-hooks 35. A short rearwardly-projecting arm is located on plate 34, and serves to sustain the blank. Two other blank-hooks, $s\ s$, are located on said frame 38, which prevent the blank from sliding on said frame. The inner carrier-frame, 37, supports the long flat fingers 36, which project forward toward the folding-box. Said inner and outer frames, 37 38, are given a reciprocating motion over said folding-box by suitable cams, 39 40, on the shaft 41, the connection of the latter devices with said frames being had through the connecting-rod 42, pivoted to an arm, 43, whose hub is secured to shaft 28, and a long arm, 45, also keyed to said shaft, is connected by a rod, 46, to frame 38, while frame 37 is operated by the cam 40, through rod 47, arm 48, on a sleeve 49, and the long arm 50 and connecting-rod 51. The above-named actuating devices for said carrier-frames have their movements so timed that the inside frame, 37, moves forward after the outer one has so moved, but much faster than the latter, which first carries plate 34 under the picked-up gummed blank, and catches it when the spider 56ª disengages it from the pickers. Said fingers 36 are then carried up under the blank, and then both of said frames move back, together with the blank, until the latter is brought over the folding-box, when fingers 36 draw away from under the blank, letting it drop on said box.

The devices which operate the folding-box plunger are of the ordinary description.

The folding-box proper and the side and end folding-wings and the hinged bottom are constructed and operate substantially in the ordinary manner.

The improvements connected with the folding-box to facilitate the discharge of the folded envelopes consist of a back pusher, 56, pivoted to swing over the said bottom after the latter has dropped down to let out an envelope. Said pusher 56 is held back by an arm, 57, fixed on the end of the box-bottom $d$, so that when said bottom is shut against the box the pusher and said arm stand relatively as shown in Fig. 11; but when said bottom swings down the end of said arm swings below the pivot-point of said pusher and allows the spring 58 to throw the latter forward with a quick motion against the edge of a folded envelope to knock it off from said bottom. Two upright plates, $c\ c$, are secured to said pusher to make its contact with the said folded envelope more sure. The usual detaching-fingers, 59, operate through the bottom $d$. A second envelope-pusher, 60, is fixed to the table of the machine, forward of the folding-box, and is operated by a cam, 62, fixed on the seal-flap or front folding-wing, 61, and a spring, 63. The said folding-wing shaft 64 is oscillated by its connection with a cam, 65, on shaft 41, through its connection therewith by the arm 66, hung on shaft 41ª, a spring, 67, connecting-rod 68, and arm 69 on shaft 64. The operation of said second pusher, 60, is as follows: When the plunger descends into the folding-box, the front pusher, 60, stands in the position shown in Fig. 3, and the pin $x$ in its side, Fig. 10, rests on cam 62 at about $z$. After the plunger rises the end and back folding-wings perform their respective operations. Immediately after the latter cam 65 is in a position to let arm 66 drop into the depression $o$ on said cam and operate the wing 61 to fold the seal-flap, causing pin $x$ on the pusher 60 to take a position between its present one, as shown in Fig. 10, and the point $z$ on the border of the cam 62. When the wing 61 swings over to fold the seal-flap, as just described, the end of the pusher 60 swings downward, nearly touching the envelope, over beyond said folding-wing, and cam 65 now operates to bring the projection $o^2$ under arm 66, lifting wing 61 enough to allow time for the said side and end wings to swing up out of the way. The cam 65, as it continues to revolve, comes to such a position as to allow arm 66 to take the position shown in Fig. 10, resting or dropping into the depression beyond the point $o^2$, and said depression, being deeper than that one indicated by $o$, allows wing 61 to swing farther down than it did when it folded the seal-flap, and consequently lets pusher 60 drop downward and its end enter so far into the folding-box as to strike the envelope just folded, and, overcoming any inclination it may have to adhere by its borders to the folding-box, make its exit from the latter sure and prompt.

The usual separator devices for preventing more than one blank at a time from being taken up by the pickers are employed in this machine, and are partly shown in plan view in Fig. 4, each side of the spider $56^a$.

What I claim as my invention is—

1. The picker $a$, having the arm 16 thereon, the series of screws 3, connected together by gears and fitted to rotate in table 4, one or more blank-plates, 2, and mechanism, substantially as described, interposed between said picker and said screws, whereby the latter are caused to be rotated and said plate 2 to be moved upward toward said picker when the proper operation of the latter to pick up blanks demands it, combined and operating substantially as set forth.

2. In combination, the picker $a$, provided with arm 16, the lever 7, having thereon the post 12, the jointed latch 9, and the pawl 13, pivoted to said lever, springs 10 and 11, the series of screws 3, one of which is provided with a ratchet, $3^a$, and one or more plates 2, substantially as set forth.

3. The gum-box 18, the rolls 19 20, and the slides 21 22 $22^a$, adjustable to the surface of said rolls, combined and operating substantially as set forth.

4. In an envelope-machine, the combination, with a suitable gum-box and gum-delivering rolls, and with the blank-pickers of said machine, of a series of gumming-rollers adapted to rotate intermittently by mechanism, substantially as described, around a common center in a plane coinciding with that of the surface of said gum-box rolls and of the edges of said blank-pickers, substantially as set forth.

5. In combination, shaft 24, having gear $a'$ thereon, the rolls 23, supported on said shaft, on arms projecting at right angles thereto, the notched gear-wheel 25, the elbow-lever 26, provided with pawl $a^2$, and mechanism, substantially as described, for imparting an oscillating motion to said elbow-lever, substantially as set forth.

6. The blank-carrier frame 38, provided with suitable blank-hooks, the carrier-frame 37, moving within frame 38, and provided with the arms 36 and the plate 34, and mechanism, substantially as described, for imparting to said frames differentially - reciprocating motions over the folding-box and under the blank-pickers, combined and operating substantially as set forth.

7. The combination, with the bottom $d$ of the folding-box, having the arm 57 on one end thereof, of the back envelope-pusher, 56, and spring 58, substantially as set forth.

8. The folding-wing 61 and appliances, substantially as described, for giving it successive vibratory motions, the envelope-pusher 60, pivoted to one side of said folding-wing, and means, substantially as described, interposed between said wing and pusher, whereby the end of the latter is permitted to drop below the under face of said wing after the seal-flap of the envelope has been folded down, combined and operating substantially as set forth.

9. The picker $a$, provided with the arm 16, a movable blank - supporting plate, 2, and mechanism, substantially as described, interposed between said picker and said plate to cause the latter to be moved upward when the picker moves downward beyond a certain point to pick up a blank, combined and operating substantially as set forth.

FRANCIS H. RICHARDS.

Witnesses:
H. A. CHAPIN,
R. F. HYDE.